United States Patent
Mion et al.

(10) Patent No.: US 8,086,592 B2
(45) Date of Patent: Dec. 27, 2011

(54) APPARATUS AND METHOD FOR ASSOCIATING UNSTRUCTURED TEXT WITH STRUCTURED DATA

(75) Inventors: Gilles Vergnory Mion, Vaucresson (FR); Jean-Yves Cras, Paris (FR)

(73) Assignee: SAP France S.A., Paris (FR)

( * ) Notice: Subject to any disclaimer, the term of this patent is extended or adjusted under 35 U.S.C. 154(b) by 426 days.

(21) Appl. No.: 11/948,718

(22) Filed: Nov. 30, 2007

(65) Prior Publication Data
US 2009/0144295 A1 Jun. 4, 2009

(51) Int. Cl.
*G06F 7/00* (2006.01)
*G06F 17/00* (2006.01)
(52) U.S. Cl. .......... 707/711; 707/736; 707/811
(58) Field of Classification Search .......... 707/811, 707/812
See application file for complete search history.

(56) References Cited

U.S. PATENT DOCUMENTS

| | | | |
|---|---|---|---|
| 7,174,507 B2* | 2/2007 | Baudin et al. ............ 715/234 |
| 7,181,435 B2* | 2/2007 | Cambot et al. ............ 1/1 |
| 7,181,440 B2* | 2/2007 | Cras et al. .............. 1/1 |
| 7,383,169 B1* | 6/2008 | Vanderwende et al. ....... 704/9 |
| 2002/0194379 A1* | 12/2002 | Bennett et al. .......... 709/246 |
| 2005/0154692 A1* | 7/2005 | Jacobsen et al. ......... 706/47 |
| 2005/0262039 A1* | 11/2005 | Kreulen et al. .......... 707/1 |
| 2007/0078872 A1* | 4/2007 | Cohen .................. 707/101 |
| 2008/0046481 A1* | 2/2008 | Gould et al. ............ 707/203 |
| 2008/0082494 A1* | 4/2008 | Polo-Malouvier et al. .... 707/3 |
| 2008/0101130 A1* | 5/2008 | Kawaguchi et al. ..... 365/189.03 |
| 2008/0126080 A1* | 5/2008 | Saldanha et al. .......... 704/9 |

* cited by examiner

*Primary Examiner* — Kuen Lu
*Assistant Examiner* — Susan F Rayyan
(74) *Attorney, Agent, or Firm* — Mintz, Levin, Cohn, Ferris, Glovsky and Popeo, P.C.

(57) ABSTRACT

A computer readable storage medium includes executable instructions to receive a semantic abstraction describing at least one underlying data source. The semantic abstraction includes at least one dimension with at least one dimension value. Unstructured text is parsed into parsed text units. A dimension value is matched to a parsed text unit to form matched content. An indication of the matched content is stored.

17 Claims, 6 Drawing Sheets

APPARATUS AND METHOD FOR ASSOCIATING UNSTRUCTURED TEXT WITH STRUCTURED DATA

BRIEF DESCRIPTION OF THE INVENTION

This invention relates generally to data processing. More particularly, this invention is directed toward techniques for associating unstructured text with structured data.

BACKGROUND OF THE INVENTION

Business Intelligence (BI) generally refers to software tools used to improve decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems to collect, store, and manage raw data.

A subset of business intelligence tools are report generators, On-Line Analytic Processing (OLAP) tools, Enterprise Information Management (EIM) tools, Extract, Transform and Load (ETL) tools, analytics, and the like. There are a number of commercially available products to produce reports from stored data. For instance, Business Objects Americas of San Jose, Calif., sells a number of widely used report generation products, including Crystal Reports™, Business Objects Voyager™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheet applications generally work within a looping calculation model, whereas report generation tools may support a range of calculation models. Although there may be an overlap in the function of a spreadsheet document and a report document, the applications used to generate these documents contain instructions with expressly different assumptions concerning the existence of an external data source and different logical approaches to interpreting and manipulating imported data.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

Hierarchal data is data organized into a tree-like structure. Hierarchal data is structured using parent child relationships. A schema defines the valid parent child relations. Each node in the structure can be a parent, a child or both with the exception of a root node that may only be a parent. Hierarchal data is defined by its schema or implied schema. Examples of hierarchical data sources include hierarchical databases, folder and file systems, Web Services (WS), web feed formats including Really Simple Syndication (RSS), and eXtensible Markup Language (XML) files and schemas.

In the context of a business intelligence application, it is desirable to extract information from text. The information extracted from the text adds a significant value to the business intelligence application.

Prior art systems for achieving such a purpose usually perform an intensive standalone analysis of the text to extract information. The analysis is usually time consuming, which is a material drawback when the application has to be integrated in an environment having limited resources. Moreover, because of the nature of the analysis, such systems need to be highly customized in order to be efficient. This is a drawback since this limits the scope of an application and therefore requires a lot of resources for setting up, operating and maintaining a customized system. Even when such systems are highly customized, much pertinent information is missed, thereby limiting the efficiency of the system.

Accordingly, it would be desirable to provide techniques to overcome at least one of the above-identified drawbacks.

SUMMARY OF THE INVENTION

A computer readable storage medium includes executable instructions to receive a semantic abstraction describing at least one underlying data source. The semantic abstraction includes at least one dimension with at least one dimension value. Unstructured text is parsed into parsed text units. A dimension value is matched to a parsed text unit to form matched content. An indication of the matched content is stored.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
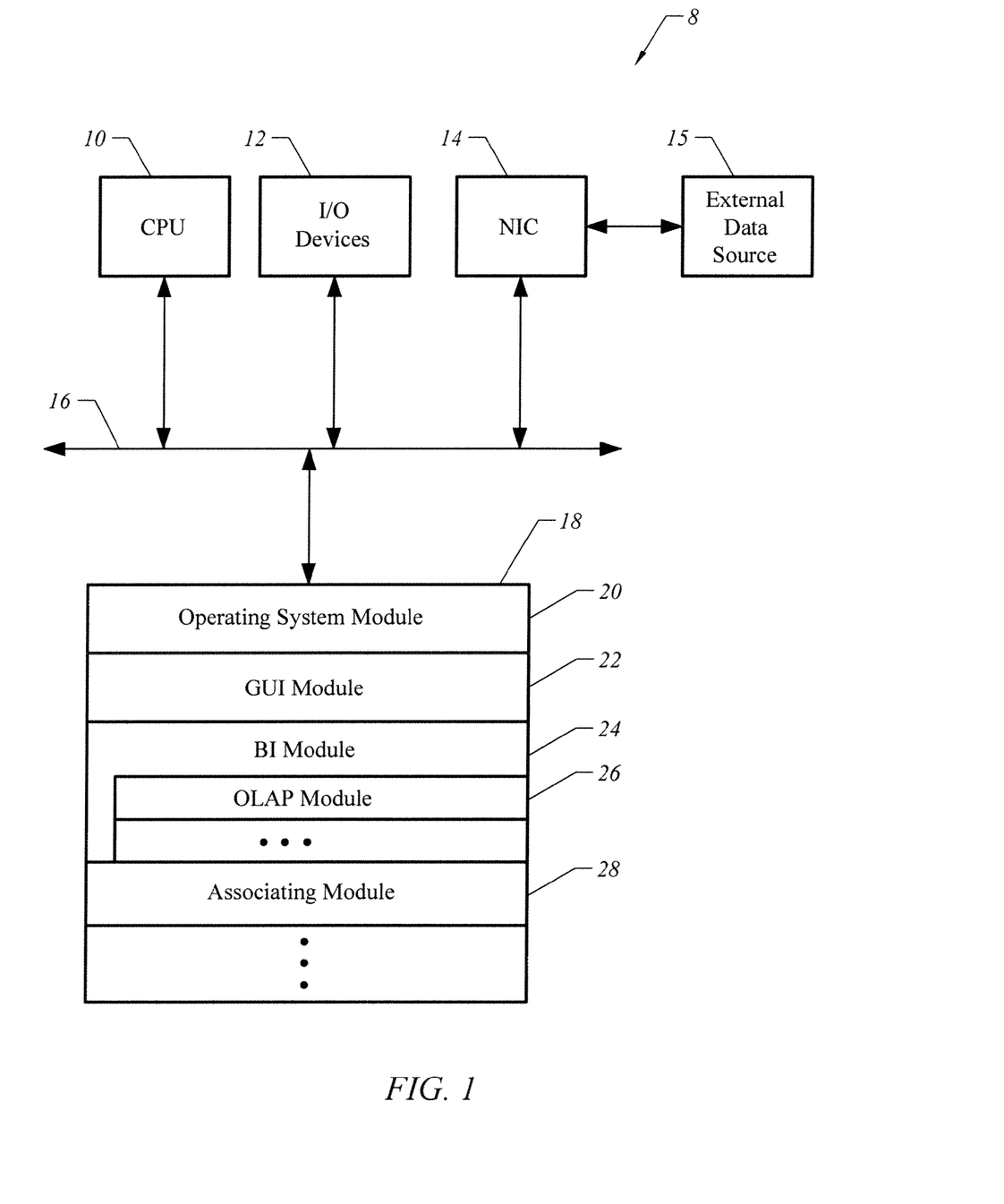
FIG. 1 illustrates a computer configured in accordance with one embodiment of the invention.

FIG. 1 illustrates a computer 8 configured in accordance with an embodiment of the invention. The computer 8 includes standard components, including a central processing unit 10 and input/output devices 12, which are linked by a bus 16. The input/output devices 12 may include a keyboard, mouse, touch screen, monitor, printer, and the like. A network interface circuit 14 is also connected to the bus 16. The network interface circuit 14 provides connectivity to a network, thereby allowing the computer 8 to operate in a networked environment. In the embodiment disclosed, connectivity is provided via the network interface circuit 14 to an external data source 15.

A memory 18 is also connected to the bus 16. In an embodiment, the memory 18 stores one or more of the following modules: an operating system module 20, a Graphical User Interface (GUI) module 22, a BI module 24, an OLAP module 26 and an associating module 28. The operating system module 20 may include instructions for handling various system services, such as file services or for performing hardware dependant tasks. The GUI module 22 may rely upon standard techniques to produce graphical components of a user interface, e.g., windows, icons, buttons, menus and the like. The user interface may include instructions to receive input from a pointer device and display a cursor on an output device. The BI module 24 includes executable instructions to perform Business Intelligence (BI) related functions, such as, generate reports, perform queries and analyses, and the like. The BI module 24 can include an OLAP module 26. The memory 18 also stores an associating module 28. The associating module 28 implements operations associated with embodiments of the invention, as discussed below.

The executable modules stored in memory 18 are exemplary. It should be appreciated that the functions of the modules maybe combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
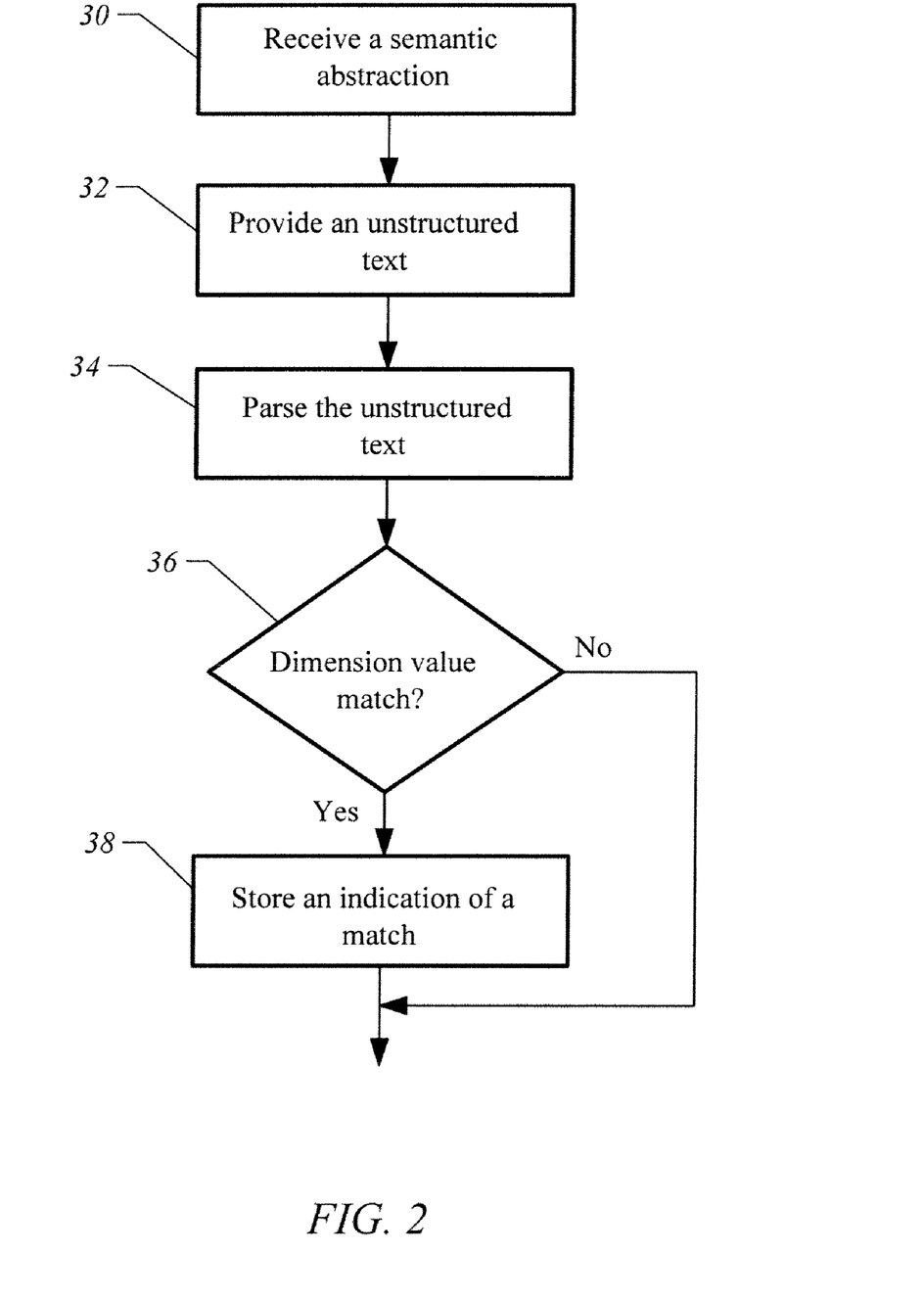
FIG. 2 illustrates processing operations associated with an embodiment of the invention.

FIG. 2 illustrates processing operations associated with the associating module 28. The associating module 28 includes executable instructions to associate unstructured text with structured data. Initially, a semantic abstraction is received 30. Semantic abstraction is the term for a semantic layer that describes an underlying data source. A semantic abstraction can be a level of abstraction based on a relational, OLAP, or other data source or a combination of more than one existing semantic layers. A universe is a specific form of semantic abstraction where the semantic abstraction includes data model objects that describe the underlying data source and define dimensions, attributes and measures that can be applied to the underlying data source and data foundation metadata that describes a connection to, structure for, and aspects of the underlying data source. A data model object is an object defined within a semantic domain that represents a dimension of the underlying data source, represents relationships between dimension members and attributes, or provides calculations from, based on or designed to be applied to an underlying data source. Typically, in a universe a data model object is assigned a common business term such that the user does not need to understand the specific logic of the underlying data source but can work with familiar terminology when constructing queries or otherwise accessing the data. Examples of common business terms include: customer, employee, product line, revenue, profit, attrition, fiscal year, quarter, and the like. The concepts of a universe and familiar names are set forth in commonly owned U.S. Pat. Nos. 5,555,403; 6,145,887; 6,247,008; 6,578,027; 7,181,435; 6,768,986; 7,181,440, which are incorporated herein by reference.

The semantic abstraction comprises at least one dimension, each of the at least one dimension comprises at least one dimension value. A dimension may be, for instance, a name of a variable such as "product name" while a dimension value may be a value associated with a corresponding field such as "product 1", "product 2", etc. A dimension value may comprise more than one word.

Next, unstructured text is provided 32. The unstructured text may be received from various sources. For instance, the unstructured text may be received from a local repository or from a remote repository, which is an example of an external data source (e.g., 15). The unstructured text may be any type of text. For instance, the unstructured text may comprise customer complaints, comments entered by employees, data originating from a website, screen scrapings, news feeds, text files, emails, RSS feeds and other types of data streams, and the like.

In one embodiment, the unstructured text is received through a business object query using a detail object describing a text column. The query returns the text and its associated primary key value. In this embodiment, the relationships between dimension values and text values are materialized through foreign keys in an intermediate table. Tables in a database can be related to each other with keys. The primary key is a column with a unique value for each row. Each primary key value is unique within the table. A foreign key is a value in a relational table that matches a value in the primary key column of another table. Dimension tables and text tables contain primary keys and the semantic abstraction describes them.

The unstructured text is then parsed 34 into a plurality of units of parsed text. In one embodiment, the parsing comprises tokenizing the text, stemming the tokenized text and removing the stop words. The tokenizing of the unstructured text splits the unstructured text into a set of text tokens or tokens of text. Generally, a text token is a single word.

Stemming is used in order to remove more common morphological and inflexional endings from words in a given language. In addition, it reduces token terms to their linguistic root form. For example, "fishes" and "fishing" would both be reduced to "fish," and "complete" and "completion" would be reduced to "complete" Tokenizing and stemming of unstructured text are common problems with many solutions. In one embodiment, the tokenizing and stemming of the unstructured text can be performed using existing tokenizing and stemming software. Tokenizing and stemming can be performed by a single software solution or separate solutions.

For each unit of parsed text, a check is performed in order to find out if there is a dimension value matching a corresponding unit of parsed text 36. In one embodiment, the check is performed by accessing an index comprising all dimension values in the semantic abstraction received. Solutions for creating the index comprising all the dimension values may be found in one of many available libraries. An "inversed index" may be created to perform an efficient search. Alternatively, specific dimension values to be searched are selected. In such an embodiment, the check is performed only in the specific dimension values selected. This enables a more targeted and efficient search.

If there is a dimension value matching a corresponding unit of parsed text (36-YES), an indication of a match is stored 38. If a unit of parsed text matches one term in a multi-word dimension value (e.g., dimension value "United States"), the text immediately surrounding the unit of parsed text is checked for the remainder of the dimension value. For example, if the word "united" is found in the unstructured text, the following word is checked to ensure that it is "states" before an indication of a match between the dimension value "United States" and the unstructured text is stored.

In one embodiment, the storing is performed as an annotation. An annotation is a piece of information that stores the fact that a given entity (e.g., a dimension value) of a given type (e.g., dimension) has been found in a given text at a specific position. In one embodiment, the information is stored in a table as a row. The table may comprise columns for the dimension value associated with a primary key, a dimension name id, a text row associated primary key, a text column id and the position in the text.

Performing a search in the table may be cumbersome in the case where the search involves the use of combined search filters. For instance, a query involving "new text with United States and Sports" where "United States" and "Sports" are dimension values is not possible when storing as an annotation. It will therefore be appreciated that the annotation is used for cases in which simple queries will be later used to access the information.

When complex queries/searches have to be performed in the stored data, the data may be stored as a set of coordinates, as explained below. More precisely, each text containing parsed text matching dimension values is associated with one or more points in a multi-dimensional space where each axis corresponds to one of the at least one dimension to which the parsed text is related.

In one embodiment for storing the data, the coordinate table comprises one foreign key column for the stored text and as many dimension foreign key columns as dimensions the parsed text can potentially be related to according to the configuration. A dimension column contains the IDs of the dimension values the parsed text is related to or 0 if no values are found in the dimension. If in a given stored text more than one dimension value is found from the same dimension, more than one coordinate is created. In fact, a Cartesian product of all the dimension value combinations is generated and stored.

In one embodiment, a number indicative of how many times a dimension value appears in a stored text may be stored. This number may then be used in order to rank dimensions/dimension values of a semantic abstraction.

The text "Joe Smith, Mr Barker and Miss Ming visited the United States and Japan" contains values from two dimensions i.e., a "name" dimension and a "country" dimension. The dimension values of the "name" dimension are "Smith", "Barker" and "Ming", while the dimension values of the "country" dimension are "United States" and "Japan". The Cartesian product of all dimension value combinations for all the dimensions provides the following results:

Smith; United States;
Smith; Japan;
Barker; United States;
Barker; Japan;
Ming; United States; and
Ming; Japan.

In one embodiment, the Cartesian product is limited to dimension values of different dimensions. Alternatively, the Cartesian product is not limited to dimension values of different dimensions and may further include results such as:

Smith; Barker;
Smith; Ming;
Barker; Ming; and
Japan, United States.

As previously indicated, it is possible to perform complex queries on the stored data. However, such an embodiment for storing the data may require a large amount of space in the case where the Cartesian product involves large numbers of dimension values.

Figure 3:
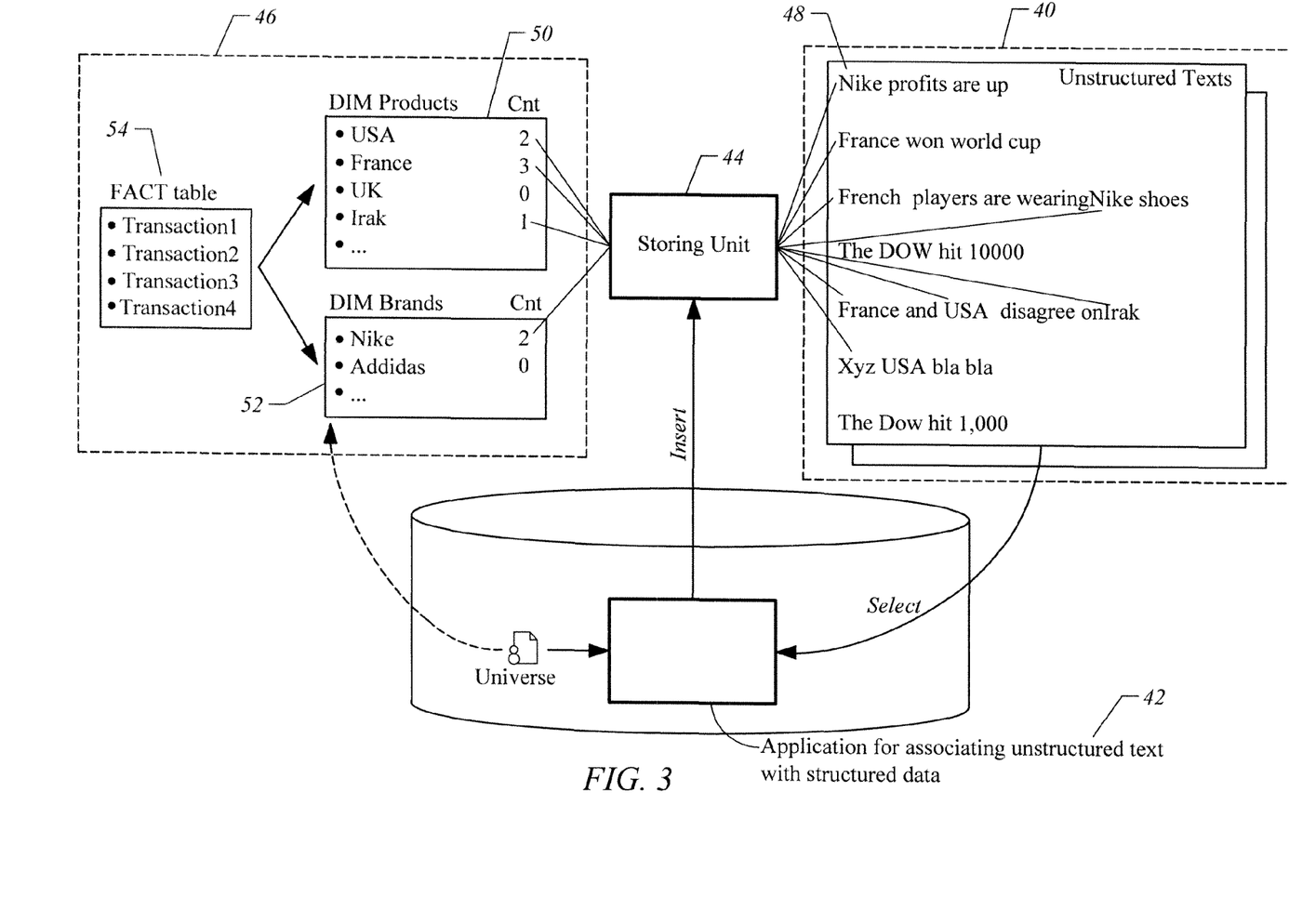
FIG. 3 is a logical view of a system for associating unstructured text with structured data in accordance with an embodiment of the invention.

FIG. 3 shows a logical view of one embodiment of a system comprising an application for associating unstructured text with structured data according to the processing disclosed in FIG. 2. In this embodiment, the system comprises a plurality of unstructured texts 40, an application for associating unstructured text with structured data 42, a storing unit 44 and a semantic abstraction 46. The plurality of unstructured texts 40 comprises, for instance, unstructured text 48.

The semantic abstraction 46 comprises a first dimension 50, a second dimension 52 and an operation or fact table 54. The first dimension 50 is a "Product" dimension and comprises, for instance, the dimension values "USA", "France", "UK", "Irak", etc. The second dimension 52 is a "Brands" dimension comprising, for instance, the dimension values "Nike", "Addidas", etc. The operation table 54 comprises at least one indication of operations involving the first and the second dimensions 50 and 52.

The storing unit 44 is used to store an indication of a match between at least one dimension value of the first dimension 50 or the second dimension 52 and a corresponding unit of parsed text generated using the plurality of unstructured texts 40. As mentioned earlier, the storing may be performed according to various embodiments.

As shown in FIG. 3, the storing unit 44 may comprise an indication of a match between the dimension value "Nike" of the second dimension 52 and the unstructured text data 48 comprising the parsed text unit "Nike". It will be appreciated that the storing unit 44 is populated by the application for associating unstructured text with structured data 42.

Figure 4:
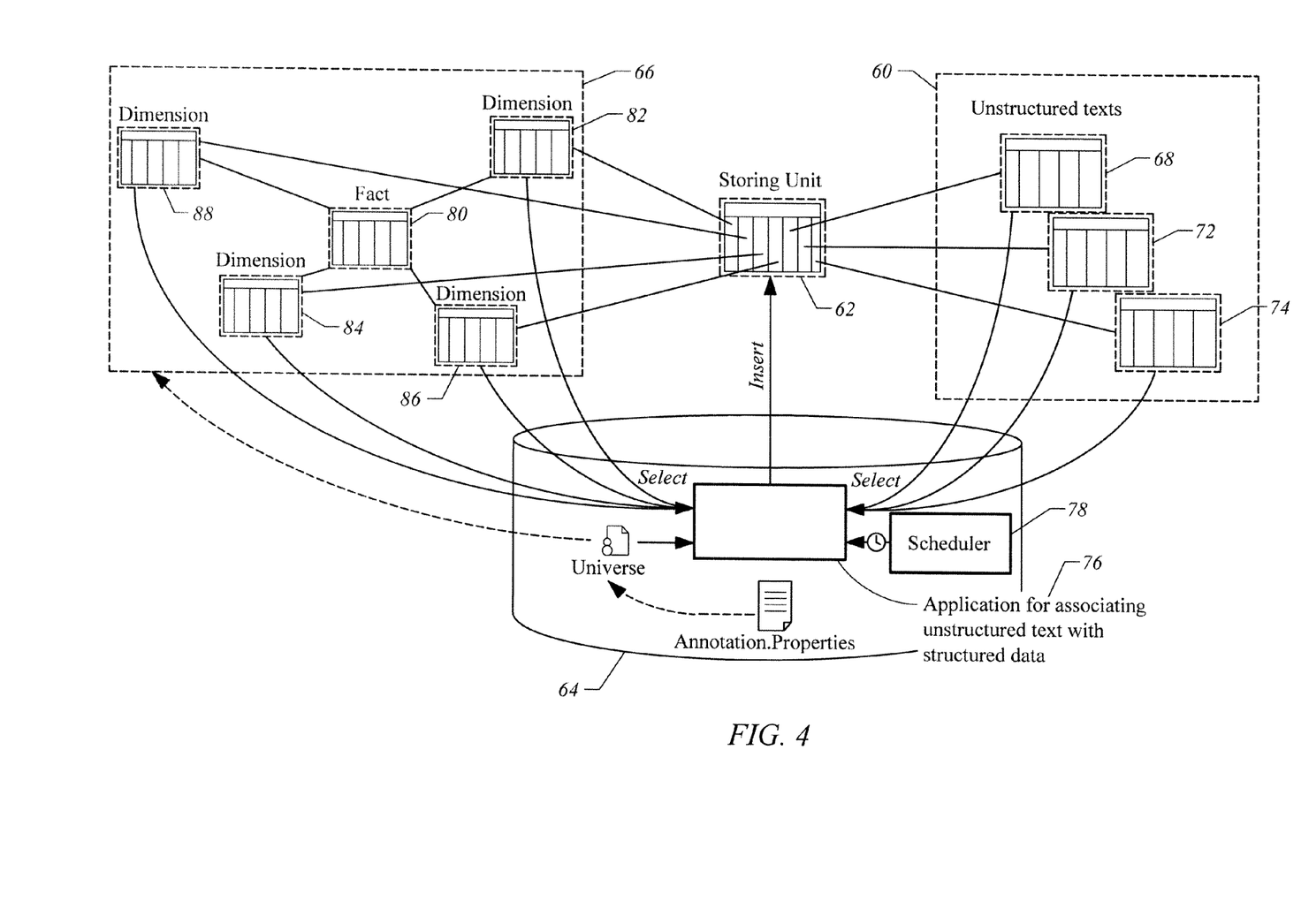
FIG. 4 is a physical view of a system for associating unstructured text with structured data in accordance with an embodiment of the invention.

FIG. 4 shows one embodiment of a physical view of a system where the application for associating unstructured text with structured data is used. The system comprises a plurality of unstructured texts 60, a storing unit 62, an application for associating unstructured text with structured data 76 and a semantic abstraction 66. The unstructured texts 60 may be received by the associating module 28 from practically any source, as previously discussed. The associating module 28 includes the application for associating unstructured text with structured data 76. In addition, the associating module 28 may include the storing unit 62 and the semantic abstraction 66.

Still referring to FIG. 4, the plurality of unstructured texts 60 comprises a first table comprising unstructured text 68, a second table comprising unstructured text 72, and a third table comprising unstructured text 74. The tables 68, 72, and 74 contain different types of unstructured texts that are of interest for associating with dimension values. For example, the first table 68 contains news feeds, the second table 72 contains emails and the third table 74 contains customer complaints. In this example, the semantic abstraction 66 comprises an operation table 80, a first table 82, a second table 84, a third table 86 and a fourth table 88.

The application for associating unstructured text with structured data 76 receives unstructured text from each table of the plurality of unstructured texts 60. The application for associating unstructured text with structured data 76 further receives a plurality of dimension values from the first table 82, the second table 84, the third table 86 and the fourth table 88 of the semantic abstraction 66.

The application for associating unstructured text with structured data 76 populates the storing unit 62 using the received plurality of unstructured text and the plurality of dimension values. More precisely and as explained earlier, the application for associating unstructured text with structured data 76 populates the storing unit 62 with an indication of a match between a given unit of parsed text and at least one corresponding dimension value.

Using the storing unit 62, the plurality of unstructured texts 60 becomes linked or attached to the plurality of dimension values of the semantic abstraction 66. The application for associating unstructured text with structured data 76 may operate using a scheduler 78, which triggers its operation. Alternatively, the application for associating unstructured text with structured data may operate in an event driven fashion. The event may be, for instance, the insertion of new text in a database which would trigger, for instance, an incremental analysis of the new text.

The application for associating unstructured text with structured data 76 may be configured using a configuration file 64. The configuration file 64 may comprise various information such as an identification of an unstructured text to use, an identification of a type of storing to perform (e.g., as an annotation or not), an identification of a stemming language to use, an identification, through the semantic abstraction, of the dimensions to relate, etc. It will be appreciated that the configuration file 64 is, in one embodiment, a text file which may be edited using a text editor.

Figure 5:
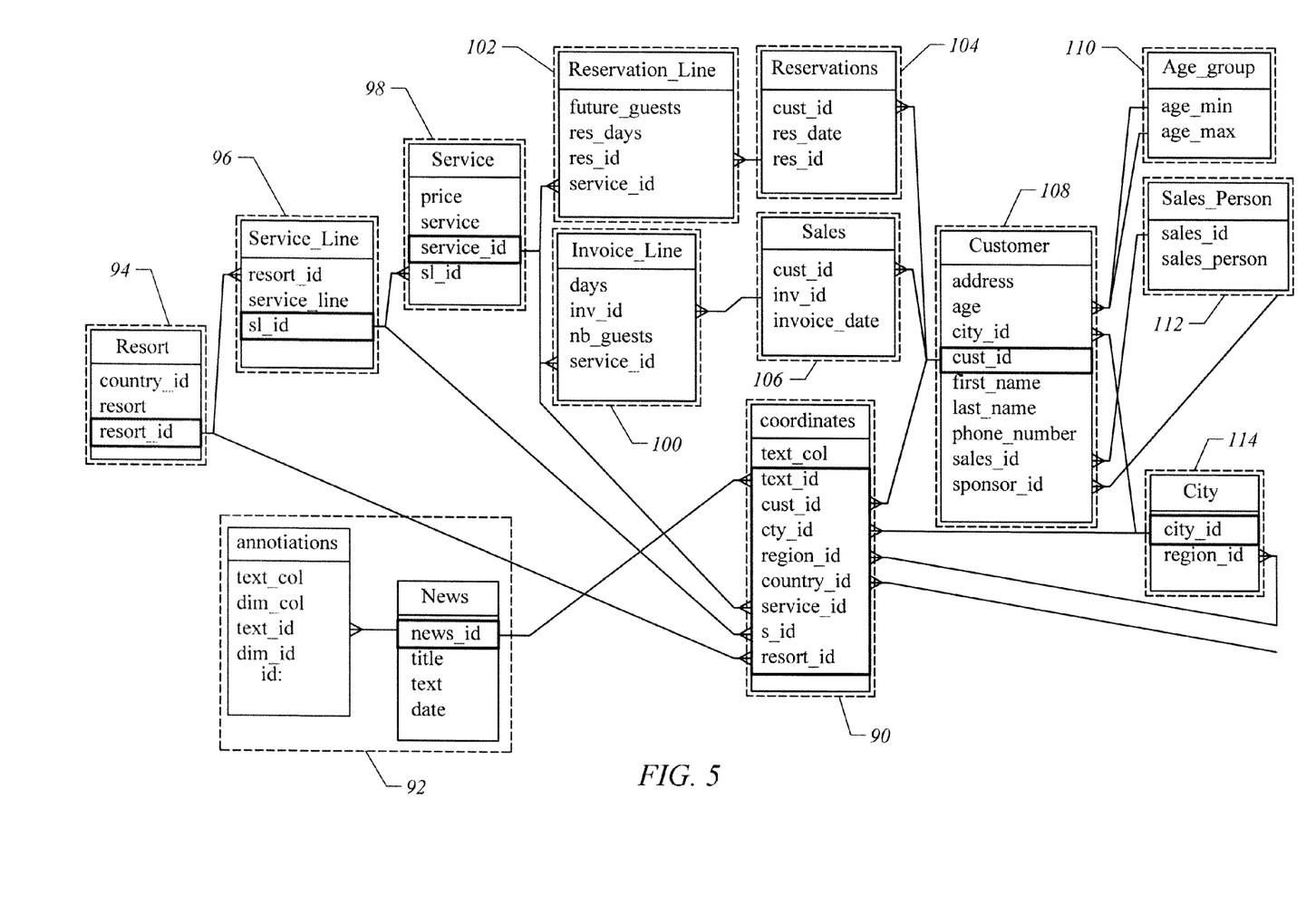
FIG. 5 is a database diagram illustrating a storing unit integrated with an existing set of tables associated with a semantic abstraction.

FIG. 5 illustrates a database configuration where the application for associating unstructured text with structured data 76 has been advantageously used. In this database configuration, the semantic abstraction has been used and shows a plurality of tables. Each table has a plurality of dimensions using business terms. In FIGS. 3 and 4 the storing unit and the unstructured text are external components, while in FIG. 5, the unstructured text and the storing unit are copied into the semantic abstraction. For instance, the semantic abstraction discloses "Resort" table 94, "Service_Line" table 96, "Service" table 98, "Invoice_Line" table 100, "Reservation_line" table 102, "Reservations" table 104, "Sales" table 106, "Customer" table 108, "Age_Group" table 110, "Sales_Person" table 112 and "City" table 114. In this embodiment, the storing unit is "Coordinates" table 90, which is linked with the corresponding "Resort" table 94, the "Service_Line" table 96, the "Service" table 98, the "Customer" table 108 and the "City" table 114. These tables, 94, 96, 98, 108 and 114, are linked to the "Coordinates" table 90 because they contain dimension values that should be searched for in the unstructured texts. The storing unit 90 is further connected to "annotations" and "news" tables 92, which comprise the unstructured text. Thus, as shown in FIG. 5, the invention enables a user to transparently associate unstructured text with existing structured data.

Figure 6:
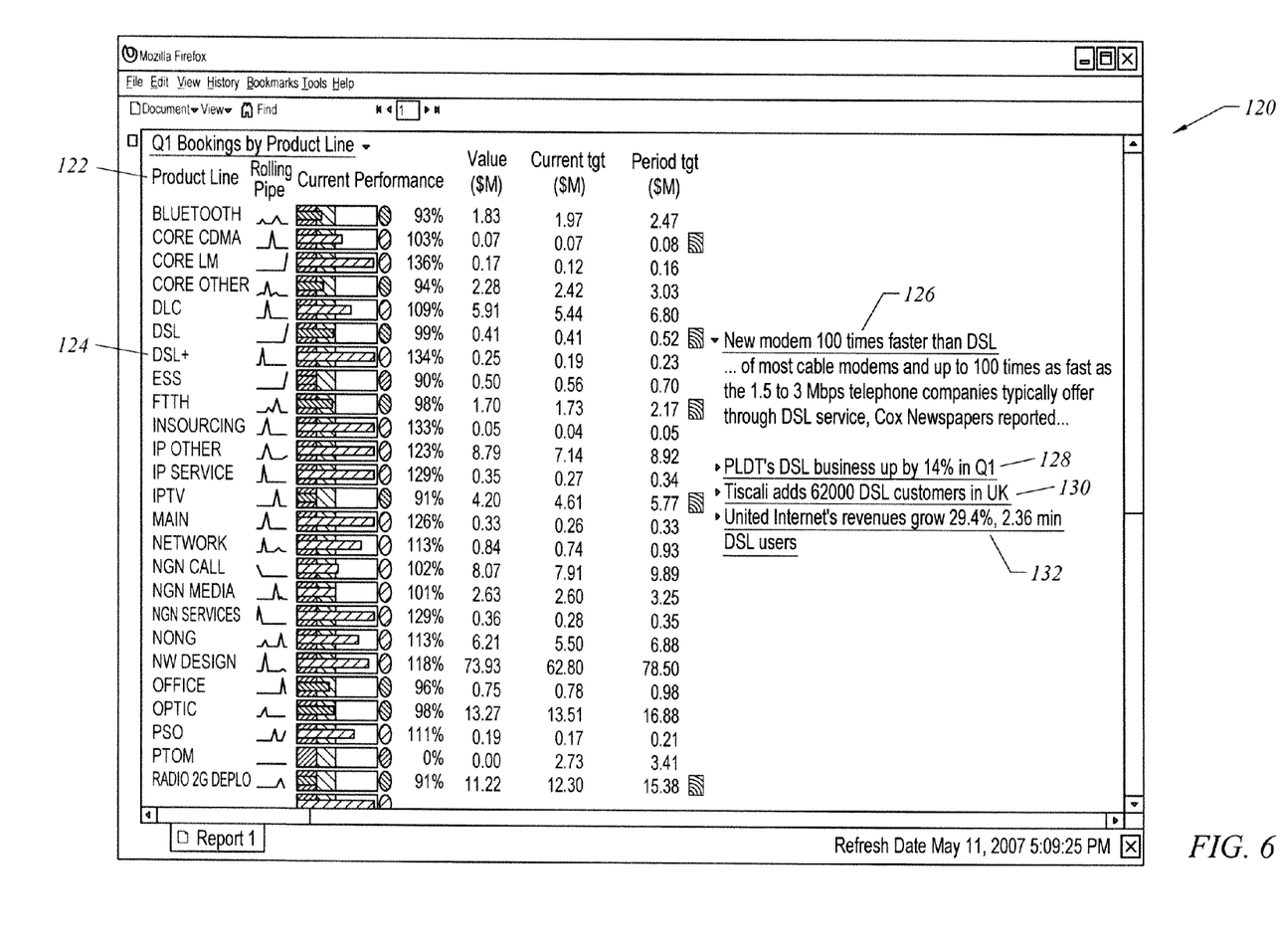
FIG. 6 is a screenshot of a table in a report formed in accordance with an embodiment of the invention.

FIG. 6 illustrates a screenshot of a table in a report where the method for associating unstructured text with structured data is being advantageously used. The screenshot 120 discloses a table with a listing for a dimension entitled "product line" 122, the dimension entitled "product line" 122 includes dimension value "DSL" 124. As shown in the screenshot 120, unstructured texts 126, 128, 130 and 132 are associated with dimension value 124 because the dimension value "DSL" has been located in each of the unstructured texts 126-132. This is of great advantage for a user operating the application as it allows the user to supplement the data for a dimension value with external data, in this case, from a news feed. The unstructured texts 126, 128, 130 and 132 are positioned next to the dimension value "DSL" 124. Moreover, it will be appreciated that more than one dimension value may be associated with the unstructured text.

Advantageously, the invention analyzes unstructured text by looking at terms that are relevant to existing business dimensions, which are leveraged using existing business intelligence infrastructure. The invention creates relationships between unstructured text records and business dimension values in the corporate data warehouse in a way that is directly exploitable by business intelligence tools. By leveraging existing semantic data and search indexes, the cost of setting up and running the system is minimal, which is a great advantage over the prior art. Instead of performing an ad hoc complex semantic analysis of the unstructured text, the invention uses already structured and indexed data plus the semantic layer describing it as a starting point. Thus, the invention facilitates relating external data and corporate data. This adds value to business intelligence applications by increasing the contextual information available to a business user for making business decisions. Example applications of the invention include combining farm lot crop yields with local temperature data feeds, combining company revenues by geography with US government demographic data feeds, or integrating ERP manufacturing information with a manually entered sales forecast from an Excel spreadsheet. In all these cases, managing user access through, for instance, Business Objects XIR2 sold by Business Objects Americas, San Jose, Calif., increases the reliability, security, and auditability of a resulting business intelligence solution. The seamless integration of structured and unstructured data allows users to create reports, analytics and dashboards that allow for more sophisticated views of data.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
    receive a semantic abstraction describing at least one underlying data source, wherein the semantic abstraction includes data model objects including source dimensions and corresponding source dimension values;
    form an index with the source dimensions and the corresponding source dimension values derived from the data model objects of the semantic abstraction;
    parse secondary source unstructured text into a plurality of parsed text units, wherein the secondary source unstructured text is from a data source separate from the underlying data source;
    match a source dimension value from the index to a parsed text unit to form matched content;
    store the matched content in a table specifying a source dimension of the underlying data source, corresponding source dimension values and a count for a parsed text unit from the external source unstructured text that matches a dimension value;
    create an annotation in the table indicative of the number of matches between a selected dimension value and parsed text units; and
    process the table to rank the relevance of the external source unstructured text to the semantic abstraction of the underlying data source.

2. The computer readable storage medium of claim 1 wherein the secondary source unstructured text is supplied from one of a local repository and a remote repository.

3. The computer readable storage medium of claim 1 wherein the secondary source unstructured text is selected from customer complaints, screen scrapings, news feeds, text files, Really Simple Syndication (RSS) feeds, data streams and emails.

4. The computer readable storage medium of claim 1 wherein the secondary source unstructured text is provided in response to a query.

5. The computer readable storage medium of claim 1 wherein the executable instructions to parse include executable instructions to tokenize the unstructured text to form tokenized text, stem the tokenized text, and remove stop words to produce the parsed text units.

6. The computer readable storage medium of claim 1 further comprising executable instructions to create a coordinate in the table indicative of a match between a plurality of source dimension values and the parsed text unit.

7. The computer readable storage medium of claim 6 further comprising executable instructions to rank the coordinate.

8. The computer readable storage medium of claim 1 further comprising executable instructions to simultaneously display a dimension value and associated unstructured text.

9. The computer readable storage medium of claim 1 further comprising executable instructions to apply a business intelligence tool to the matched content to generate a report.

10. A method for implementation by one or more data processors, the method comprising:
    receiving, by at least one processor, a semantic abstraction describing at least one data source, the semantic abstraction comprising data model objects including source dimensions and corresponding source dimension values;
    forming, by at least one processor, an index with the source dimensions and the corresponding source dimension values derived from the data model objects of the semantic abstraction;
    parsing, by at least one processor, unstructured text into a plurality of parsed text units;
    matching, by at least one processor, a source dimension value to a parsed text unit to form matched content;
    storing, by at least one processor, the matched content in a table; and
    creating, by at least one processor, an annotation in the table indicative of number of matches between a selected dimension value and parsed text units.

11. The method in accordance with claim 10, wherein the table specifies a source dimension of the data source, corresponding source dimension values and a count for a parsed text unit from the unstructured text that matches a dimension value.

12. The method in accordance with claim 11 further comprising:
    processing, by at least one processor, the table to rank the relevance of the unstructured text to the semantic abstraction of the data source.

13. The method in accordance with claim 10, wherein the unstructured text is obtained from a secondary source separate from the at least one data source.

14. The method in accordance with claim 10 further comprising:
    creating, by at least one processor, a coordinate in the table indicative of a match between a plurality of source dimension values and the parsed text unit; and
    ranking, by at least one processor, the coordinate.

15. A method to associate unstructured text with structured data, the method being implemented by one or more data processors and comprising:
    receiving, by at least one processor, structured data from at least one first data source, the structured data comprising source dimensions and corresponding source dimension values;

forming, by at least one processor, an index with the source dimensions and the corresponding source dimension values derived from the structured data;

receiving, by at least one processor, the unstructured text from a second data source;

parsing, by at least one processor, the unstructured text into a plurality of parsed text units;

matching, by at least one processor, a source dimension value of the source dimension values to a parsed text unit of the plurality of parsed text units to form matched content;

creating, by at least one processor, an annotation in a table indicative of number of matches between a selected dimension value and parsed text units;

processing, by at least one processor the table, to rank the matched content, the rank indicating relevance of the associating of the parsed text unit with the corresponding source dimension value.

16. The method in accordance with claim 15, wherein the table stores the matched content and specifies a count for a parsed text unit that matches a dimension value.

17. The method in accordance with claim 15, wherein the parsing comprises tokenizing the unstructured text to form tokenized text, stemming the tokenized text, and removing stop words to produce the parsed text units.

* * * * *